(12) United States Patent
Kataoka

(10) Patent No.: US 11,821,640 B2
(45) Date of Patent: Nov. 21, 2023

(54) DRAIN PUMP CLOG PREDICTION DEVICE, AIR CONDITIONER, AND DRAIN PUMP CLOG PREDICTION METHOD

(71) Applicant: DAIKIN INDUSTRIES, LTD., Osaka (JP)

(72) Inventor: Taro Kataoka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/912,893

(22) PCT Filed: Mar. 26, 2021

(86) PCT No.: PCT/JP2021/012802
§ 371 (c)(1),
(2) Date: Sep. 20, 2022

(87) PCT Pub. No.: WO2021/193903
PCT Pub. Date: Sep. 30, 2021

(65) Prior Publication Data
US 2023/0119292 A1    Apr. 20, 2023

(30) Foreign Application Priority Data
Mar. 26, 2020   (JP) .................. 2020-055911

(51) Int. Cl.
*F24F 13/22* (2006.01)
*G06T 7/60* (2017.01)
(Continued)

(52) U.S. Cl.
CPC ............ *F24F 11/32* (2018.01); *F24F 13/222* (2013.01); *G06T 7/0002* (2013.01); *G06T 7/60* (2013.01)

(58) Field of Classification Search
CPC ........ F24F 11/32; F24F 13/222; G06T 7/0002; G06T 7/60
(Continued)

(56) References Cited

U.S. PATENT DOCUMENTS 7,191,606 B1 *   3/2007   Dwyer ................. F24F 13/222
                                                  62/150
10,610,907 B1 *  4/2020   Scaringe ............. F24F 13/222
(Continued)

FOREIGN PATENT DOCUMENTS

EP     3 933 387 A1    1/2022
JP     2013-002719 A   1/2013
(Continued)

OTHER PUBLICATIONS

International Preliminary Report on Patentability issued in PCT/JP2021/012802, dated Oct. 6, 2022.
(Continued)

*Primary Examiner* — Sheela C Chawan
(74) *Attorney, Agent, or Firm* — Birch, Stewart, Kolasch & Birch, LLP

(57) ABSTRACT

A drain pump clog prediction device predicts the clogging of a drain pump, which is configured to drain water out of a drain pan of an air conditioner. The drain pump clog prediction device includes an obtaining portion that obtains information related to an object in the drain pan and a prediction portion calculates at least one of an object amount, an object size, and an object inflow amount based on information obtained by the obtaining portion and predicts occurrence of the clogging of the drain pump based on at least one of the object amount, the object size, and the object inflow amount.

21 Claims, 7 Drawing Sheets

(51) Int. Cl.
*F24F 11/32* (2018.01)
*G06T 7/00* (2017.01)

(58) Field of Classification Search
USPC .......................................................... 382/100
See application file for complete search history.

(56) References Cited

U.S. PATENT DOCUMENTS

| 2004/0250841 | A1* | 12/2004 | Kimbrough | B08B 3/04 |
| | | | | 134/115 R |
| 2020/0248924 | A1 | 8/2020 | Suzuki et al. | |
| 2021/0131690 | A1 | 5/2021 | Suzuki et al. | |
| 2022/0044458 | A1 | 2/2022 | Inaba | |

FOREIGN PATENT DOCUMENTS

| JP | 2013-194980 A | 9/2013 |
| JP | 2017-146017 A | 8/2017 |
| JP | 2019-039657 A | 3/2019 |
| JP | 2019-138548 A | 8/2019 |
| JP | 6791419 B2 | 11/2020 |
| JP | 6813043 B2 | 1/2021 |

OTHER PUBLICATIONS

International Search Report (PCT/ISA/210) issued in PCT/JP2021/012802, dated May 25, 2021.
Written Opinion of the International Searching Authority (PCT/ISA/237) issued in PCT/JP2021/012802, dated May 25, 2021.
Extended European Search Report dated Jul. 27, 2023 in corresponding EP 21774228.7.

* cited by examiner

DRAIN PUMP CLOG PREDICTION DEVICE, AIR CONDITIONER, AND DRAIN PUMP CLOG PREDICTION METHOD

TECHNICAL FIELD

The present disclosure relates to a drain pump clog prediction device, an air conditioner, and a method for predicting clogging of a drain pump.

BACKGROUND ART

A device for hampering the clogging of a drain pump in an air conditioner is known (for example, Patent Literature 1). This technique determines whether the suction port of the drain pump is clogged and hampers the drain pump from clogging based on the determination.

CITATION LIST

Patent Literature

Patent Literature 1: Japanese Laid-Open Patent Publication No. 2019-138546

SUMMARY OF THE INVENTION

Technical Problem

When the drain pump is clogged and the cooling operation continues, water may overflow from the drain pan. When the drain pump is clogged, even if the cooling operation is stopped, the heat exchanger remains in a cooled state for a while. As a result, water may flow into the drain pan and overflow from the drain pan. It is an objective of the present disclosure to provide a drain pump clog prediction device, an air conditioner, and a method for predicting the clogging of a drain pump that are configured to predict occurrence of a clog.

Solution to Problem

To achieve the objective, a drain pump clog prediction device predicts clogging of a drain pump configured to drain water out of a drain pan of an air conditioner. The drain pump clog prediction device includes an obtaining portion that obtains information related to an object in the drain pan and a prediction portion that calculates at least one of an object amount, an object size, and an object inflow amount based on information obtained by the obtaining portion and predicts occurrence of clogging of the drain pump based on at least one of the object amount, the object size, and the object inflow amount. This configuration predicts the clogging of the drain pump.

In the drain pump clog prediction device described above, the obtaining portion obtains an image formed based on image-capturing of the drain pan as the information. The prediction portion calculates at least one of the object amount, the object size, and the object inflow amount based on the image and predicts clogging of the drain pump based on at least one of the object amount, the object size, and the object inflow amount. This configuration predicts the clogging of the drain pump based on the image of the drain pan.

In the drain pump clog prediction device described above, the prediction portion calculates the object amount of the object present in a predetermined region of the drain pan based on the image and predicts clogging of the drain pump based on the object amount. This configuration predicts the clogging of the drain pump based on the object amount obtained from the image of the drain pan.

In the drain pump clog prediction device described above, the prediction portion calculates the object size of the object present in a predetermined region of the drain pan based on the image and predicts clogging of the drain pump based on the object size. This configuration predicts the clogging of the drain pump based on the object size obtained from the image of the drain pan.

In the drain pump clog prediction device described above, the obtaining portion obtains an image of the drain pan captured in a predetermined cycle. The prediction portion calculates the object inflow amount over a predetermined period based on captured images and predicts clogging of the drain pump based on the object inflow amount. This configuration predicts the clogging of the drain pump based on the object inflow amount obtained from the image of the drain pan.

In the drain pump clog prediction device described above, the prediction portion provides each of the images with a reference line at a portion corresponding to a predetermined position of the drain pan, detects a length of at least one object along the reference line when the object extends over the reference line, and adds the length of at least one object along the reference line in each of consecutive ones of the images to calculate the object inflow amount. This configuration simplifies the calculation of the object inflow amount.

In the drain pump clog prediction device described above, when the length along the reference line does not change in consecutive ones of the images, the prediction portion adds the length of the object along the reference line without adding the consecutive unchanged lengths. This configuration accurately calculates the object inflow amount.

In the drain pump clog prediction device described above, the prediction portion changes the predetermined cycle based on an operating load of the air conditioner.

A change in the operating load of the air conditioner changes the speed of water flowing into the drain pan. When images of the drain pan are captured a fixed number of times in the predetermined period, the number of times the object extends over the reference line changes as the flow speed changes. As a result, even when the same size of the object flows in, the object inflow amount calculated by the prediction portion may vary as the flow speed changes. The above configuration changes the predetermined cycle, which is an interval between image obtainments used for calculation of the object inflow amount, based on the operating load of the air conditioner. Thus, the object inflow amount is accurately calculated.

In the drain pump clog prediction device described above, the prediction portion changes the predetermined period based on an operating load of the air conditioner.

This configuration changes the predetermined period, for which the object inflow amount is calculated, in accordance with the operating load of the air conditioner. Thus, the accuracy for predicting the clogging of the drain pan is increased.

In the drain pump clog prediction device described above, the prediction portion predicts at least one of an occurrence rate of clogging of the drain pump and an occurrence time of clogging of the drain pump as a prediction about occurrence of clogging of the drain pump. This configuration provides the user with at least one of the occurrence rate of the clogging of the drain pump and the occurrence time of the clogging of the drain pump.

In the drain pump clog prediction device described above, the prediction portion is configured to predict an occurrence time of clogging of the drain pump. The prediction portion predicts the occurrence time of clogging of the drain pump when the object inflow amount flowing into the drain pan exceeds a specified value in a predetermined set period.

This configuration predicts the occurrence time of the clogging of the drain pump only when the amount of object flowing into the drain pan in the predetermined set period exceeds the specified value. Thus, the calculation load on the drain pump clog prediction device is reduced.

In the drain pump clog prediction device described above, the prediction portion determines the specified value based on at least one of an operating season of the air conditioner and an installation environment of the air conditioner.

This configuration changes the specified value, which restricts prediction of the clogging of the drain pump, based on at least one of the operating season and the installation environment. Accordingly, the frequency of making a prediction is changed based on at least one of the operating season and the installation environment.

The drain pump clog prediction device described above further includes a notification portion that issues a notification of a result predicted by the prediction portion.

This configuration notifies the result predicted by the prediction portion to the user.

To achieve the objective, an air conditioner includes any one of the drain pump clog prediction devices described above.

This configuration allows the air conditioner to predict the clogging of the drain pump.

To achieve the objective, a drain pump clog prediction method is for predicting clogging of a drain pump, which is configured to drain water out of a drain pan of an air conditioner. The drain pump clog prediction method includes an obtaining step of obtaining information related to an object in the drain pan and a predicting step of calculating at least one of an object amount, an object size, and an object inflow amount based on the information and predicting occurrence of clogging of the drain pump based on at least one of the object amount, the object size, and the object inflow amount. This configuration predicts the clogging of the drain pump.

In the drain pump clog prediction method described above, in the obtaining step, an image formed based on image-capturing of the drain pan is obtained as the information. In the predicting step, at least one of the object amount, the object size, and the object inflow amount is calculated based on the image, and clogging of the drain pump is predicted based on at least one of the object amount, the object size, and the object inflow amount. This configuration predicts the clogging of the drain pump based on the image of the drain pan.

In the drain pump clog prediction method described above, in the predicting step, the object amount of the object present in a predetermined region of the drain pan is calculated based on the image, and clogging of the drain pump is predicted based on the object amount. This configuration predicts the clogging of the drain pump based on the object amount obtained from the image of the drain pan.

In the drain pump clog prediction method described above, in the predicting step, the object size of the object present in a predetermined region of the drain pan is calculated based on the image, and clogging of the drain pump is predicted based on the object size. This configuration predicts the clogging of the drain pump based on the object size obtained from the image of the drain pan.

In the drain pump clog prediction method described above, in the obtaining step, an image of the drain pan captured in a predetermined cycle is obtained. In the predicting step, the object inflow amount is calculated over a predetermined period based on captured images, and clogging of the drain pump is predicted based on the object inflow amount. This configuration predicts the clogging of the drain pump based on the object inflow amount obtained from the image of the drain pan.

In the drain pump clog prediction method described above, in the predicting step, each of the images is provided with a reference line at a portion corresponding to a predetermined position of the drain pan, a length of at least one object along the reference line is detected when the object extends over the reference line, and the length of at least one object along the reference line in each of consecutive ones of the images is added to calculate the object inflow amount. This configuration simplifies the calculation of the object inflow amount.

In the drain pump clog prediction method described above, in the predicting step, at least one of an occurrence rate of clogging of the drain pump and an occurrence time of clogging of the drain pump is predicted as a prediction about occurrence of clogging of the drain pump.

This configuration provides the user with at least one of the occurrence rate of the clogging of the drain pump and the occurrence time of the clogging of the drain pump.

DESCRIPTION OF EMBODIMENTS

A drain pump clog prediction device of the present embodiment will now be described.

The subject predicted by a drain pump clog prediction device 1 is an air conditioner configured to output information related to an object present in the drain pan.

Figure 1:
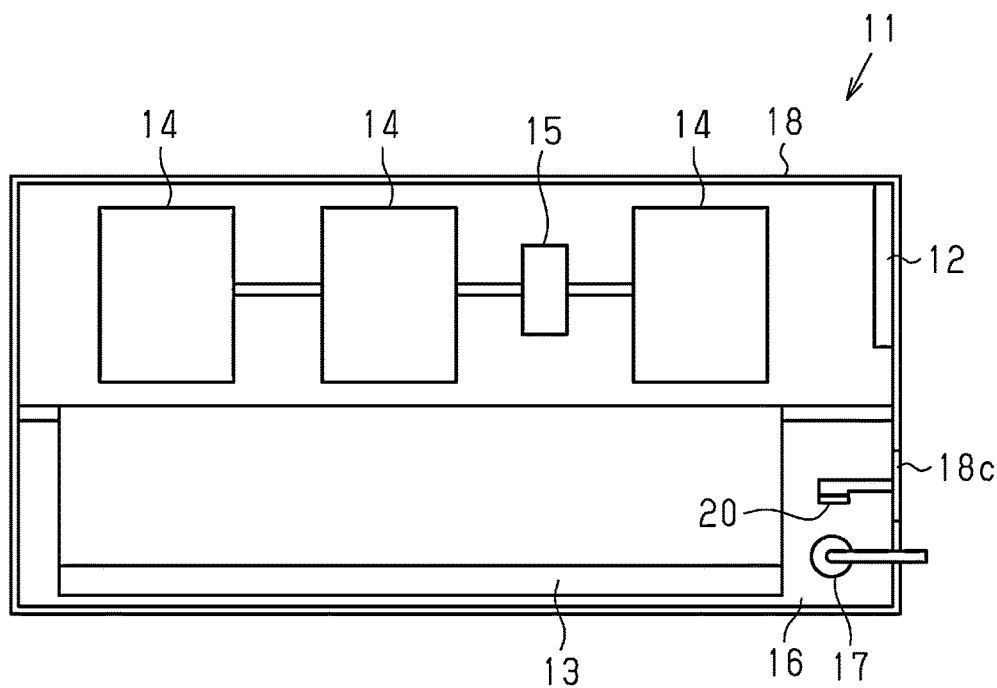
FIG. 1 is a plan view showing the internal structure of an indoor unit.
Figure 2:
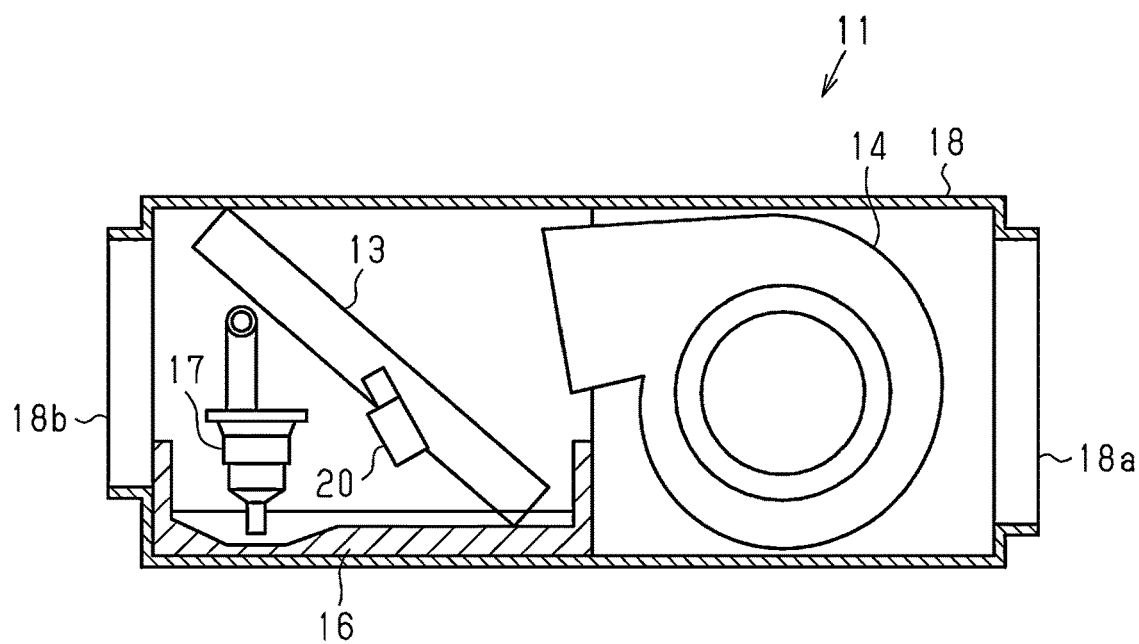
FIG. 2 is a side view of the internal structure of the indoor unit.

An example of the air conditioner 10, which is subject to the prediction, will now be described with reference to FIGS. 1 and 2. The air conditioner 10 includes an outdoor unit (not shown) and an indoor unit 11. FIG. 1 is a plan view showing the internal structure of the indoor unit 11 of the air conditioner 10 with the upper wall of the indoor unit 11 removed. FIG. 2 is a side view showing the internal structure of the indoor unit 11 of the air conditioner with a side wall of the indoor unit 11 removed.

The type of the air conditioner 10 is not limited. For example, a ceiling-embedded type, a wall-mounted type, and a wall-embedded type of air conditioner 10 are subject to the prediction for drain pump clogging. When the air conditioner 10 is of an embedded-type or a wall-mounted type, internal inspection of the indoor unit 11 is burdensome. Images of the inside of the indoor unit 11 increase the efficiency of maintenance tasks. In the embodiment, the indoor unit 11 is of a ceiling-embedded type and is connected to a duct installed behind the ceiling. The indoor unit 11 is connected to the outdoor unit by a refrigerant pipe.

The indoor unit 11 includes an air-conditioning controller 12, a heat exchanger 13, a fan 14, a fan motor 15 configured to rotate the fan 14, a drain pan 16 disposed below the heat exchanger 13, a drain pump 17 configured to drain water out of the drain pan 16, and a case 18 having an intake port 18a and a blow-out port 18b. Preferably, a color that accentuates contamination is used for the wall of the drain pan 16. Preferably, the wall of the drain pan 16 is white or a color close to white.

The case 18 includes an inspection lid 18c so that the inside of the case 18 is inspected. The inspection lid 18c is disposed close to the drain pan 16 and the drain pump 17. A camera 20 is attached to an inner side of the inspection lid 18c. The camera 20 is attached to the inspection lid 18c so as to capture an image of at least a portion of the bottom of the drain pan 16.

Figure 3:
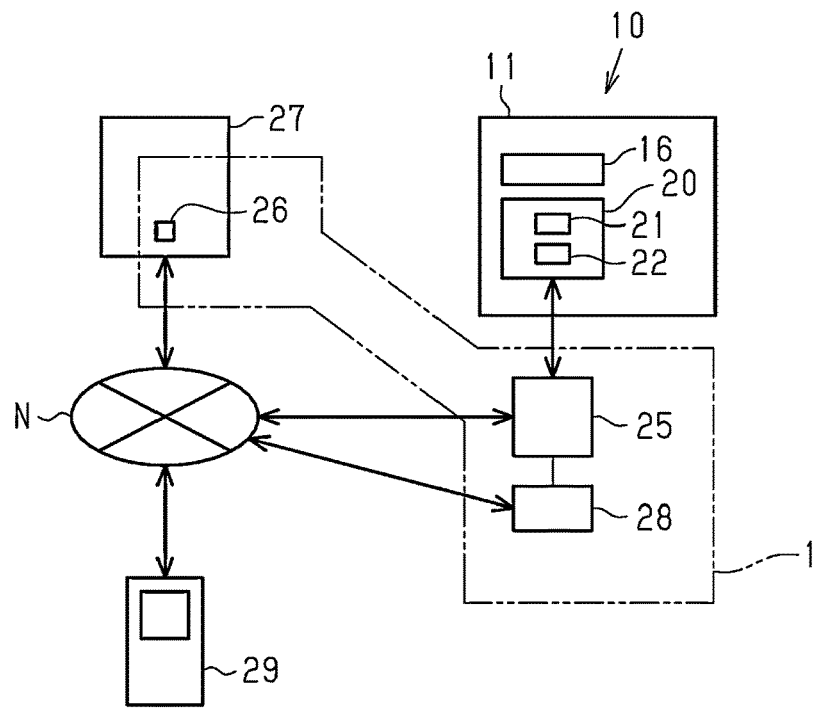
FIG. 3 is a diagram showing a system including a drain pump clog prediction device.

The camera 20 includes an image capturing portion 21 and an image capturing controller 22 (refer to FIG. 3). The image capturing portion 21 captures an image of a portion of the drain pan 16 to form an image 30 in accordance with the time controlled by the image capturing controller 22. The camera 20 may form a moving image. In this case, the image 30 is selected from a plurality of frames forming a moving image.

In an example, the image capturing portion 21 captures an image of the drain pan 16 when the water surface is still. The image capturing controller 22 determines whether the condition for the water surface stillness is satisfied. The water surface stillness is a state in which the surface of the water in the drain pan 16 does not move. The image capturing controller 22 determines the water surface stillness based on at least one of actuation of the drain pump 17, rotation of the fan 14, and change in the images 30 determined based on comparison of consecutively captured images 30. When the condition for the water surface stillness is satisfied, the image capturing controller 22 instructs the image capturing portion 21 to capture an image. In an example, when a prediction portion 26, which will be described later, executes a process for calculating the object amount or the object size, if the condition for the water surface stillness is satisfied, the image capturing controller 22 captures an image of the drain pan 16.

In another example, the image capturing portion 21 captures an image of the drain pan 16 when the water is flowing. The image capturing controller 22 determines whether the condition for the water flowing state is satisfied. The water flowing state is a state in which the water is moving in the drain pan 16. The image capturing controller 22 determines the water flowing state based on at least one of an actuation of the drain pump 17 and a change in the images 30 determined based on comparison of consecutively captured images 30. When the condition for the water flowing state is satisfied, the image capturing controller 22 instructs the image capturing portion 21 to capture an image. In an example, when the prediction portion 26, which will be described later, executes a process for calculating the object inflow amount, if the condition for the water flowing state is satisfied, the image capturing controller 22 captures an image of the drain pan 16.

The image capturing controller 22 sends the image 30 formed by the image capturing portion 21 to an obtaining portion 25 (refer to FIG. 3). The image capturing controller 22 sends the image 30 to the obtaining portion 25 based on an internal instruction. The internal instruction is a predetermined instruction.

The drain pump clog prediction device 1 will be described with reference to FIG. 3.

The drain pump clog prediction device 1 predicts the clogging of the drain pump 17, which is configured to drain water out of the drain pan of the air conditioner 10. The drain pump clog prediction device 1 may be configured to be circuitry that includes [1] one or more processors that execute various processes in accordance with computer programs (software), [2] one or more dedicated hardware circuits that execute at least some of various processes such as application specific integrated circuits (ASICs), or [3] a combination of these. The processor includes a CPU and memory such as RAM and ROM. The memory stores program codes or instructions configured to cause the CPU to execute processes. The memory, or a computer readable medium, includes any type of medium that is accessible by a general-purpose computer and a dedicated computer. The drain pump clog prediction device 1 includes the obtaining portion 25 and the prediction portion 26.

The obtaining portion 25 obtains information related to an object 40 present in the drain pan 16 of the air conditioner 10. In the present embodiment, the information related to the object 40 present in the drain pan 16 is the image 30 of the drain pan 16. The obtaining portion 25 obtains, as the information, the image 30 formed based on the image-capturing of the drain pan 16.

In the present embodiment, the obtaining portion 25 is connected to the air conditioner 10 and directly obtains the information from the air conditioner 10. The obtaining portion 25 may be incorporated in the indoor unit 11 of the air conditioner 10. The obtaining portion 25 may be included in a personal computer. The obtaining portion 25 may obtain the information from the air conditioner 10 through a network N. The obtaining portion 25 may be included in a server that is connected to the network N. In the present embodiment, the obtaining portion 25 is provided on the periphery of the air conditioner 10.

The obtaining portion 25 obtains an image 30 from the camera 20 and stores the image 30. Preferably, the obtaining portion 25 retains identification information of the air conditioner 10 that is subject to the prediction. Preferably, the obtaining portion 25 obtains information related to the installation environment of the air conditioner 10 that is subject to the prediction. The information related to the installation environment includes at least one of ambient temperature, humidity, atmosphere pressure, air cleanness, regional information of the installation location, weather information of the installation location, usage information of the installation location, and surrounding information of the installation location.

The ambient temperature, humidity, atmosphere pressure, and air cleanness may be detected values detected by the air conditioner 10, estimated values estimated from other parameters, or physical quantity correlated with the parameters. The regional information of the installation location is an address and information related to geography such as a plain region, a mountain forest region, a coastal region. The weather information of the installation location is information that affects ambient temperature, rainfall amount, snowfall amount, or humidity. The usage information of the installation location is usage information of a site in which the air conditioner 10 is installed and usage information of a room in the site. The usage information of a site is, for example, a restaurant or a gym. The usage information of a room is, for example, a kitchen, an entrance, or a meeting room. The surrounding information of the installation location, for example, shows whether there is a site where dust is generated such as a factory or a road in the neighborhood.

Preferably, the obtaining portion 25 obtains information related to an operating load of the air conditioner 10. The information related to an operating load includes, for example, rotational speed of a compressor of the air conditioner 10, temperature difference between the room temperature and a target temperature of the target temperature, power consumed by the air conditioner 10, and power consumed by the compressor.

The obtaining portion 25 communicates with the prediction portion 26 and the air conditioner 10. The obtaining portion 25 obtains information related to the object 40 from the air conditioner 10 based on an internal instruction and an external instruction. The obtaining portion 25 may obtain information at a point in time when the air conditioner 10 outputs information related to the object 40.

The obtaining portion 25, which retains the image 30, outputs the image 30 to the prediction portion 26 based on an internal instruction and an external instruction. Preferably, the obtaining portion 25 outputs at least one of the identification information and the information related to the installation environment, which are retained by the obtaining portion 25, to the prediction portion 26 based on an internal instruction and an external instruction. The internal instruction is an instruction that is formed at a predetermined time of day. In an example, an internal circuit of the obtaining portion 25 forms the internal instruction regularly or when a predetermined condition (for example, wireless receiving sensitivity is higher than a predetermined value) is satisfied. The external instruction is an instruction based on a request from the prediction portion 26.

The prediction portion 26 obtains information from the obtaining portion 25 via the network N. In the present embodiment, the prediction portion 26 is included in a server 27 connected to the network N. The prediction portion 26 may be included in a personal computer connected to the network N. The prediction portion 26 may be connected to the obtaining portion 25 and directly obtain information from the obtaining portion 25. It is sufficient that the computer is configured to perform calculation based on data. The computer includes a program and a calculation circuit.

The prediction portion 26 calculates at least one of the object amount, the object size, and the object inflow amount based on information obtained with the obtaining portion 25. In the present embodiment, information is the image 30 of the drain pan 16. The object refers to a substance other than water and the components of the drain pan 16. Examples of the object 40 include contamination and turbidity produced in the drain pan 16 and grit, sand, insect, or trash entering the drain pan 16. The turbidity is formed from dust, grit, mold, and the like.

Figure 4:
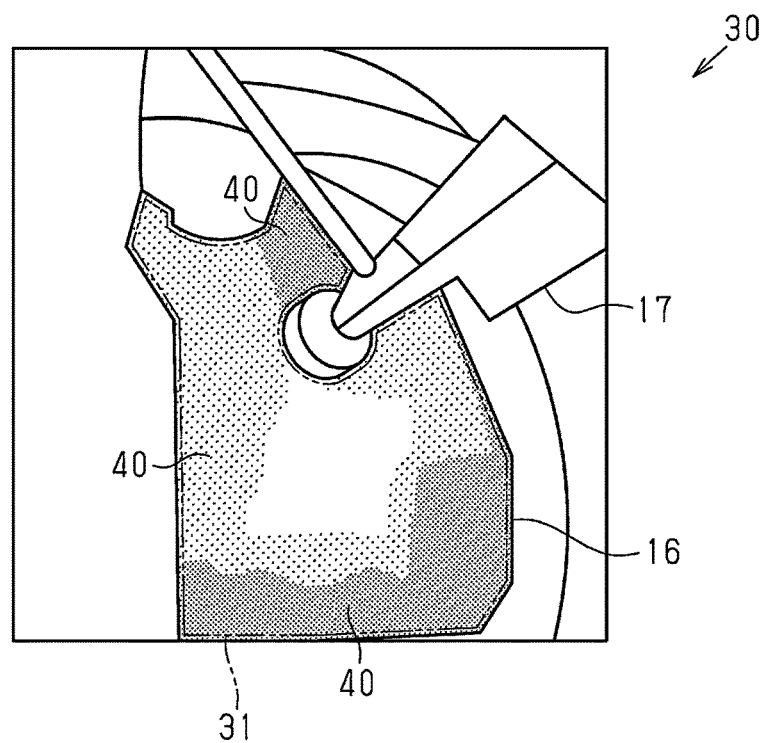
FIG. 4 is a diagram showing an example of an image of the drain pan.

Detection of an object in the drain pan 16 will now be described with reference to FIG. 4. FIG. 4 shows an image 30 of the drain pan 16 in a predetermined region 31, which has undergone color coding based on hue.

The prediction portion 26 digitizes objects 40 in the drain pan 16 based on the image 30 in accordance with an instruction of a user or at a predetermined timing. More specifically, the prediction portion 26 calculates a hue of each pixel of the image 30 of the drain pan 16. When the image 30 is an image formed based on RGB color model, the prediction portion 26 converts the image 30 using an RGB to HSV conversion formula to obtain a value of the hue of each pixel.

The hues of the objects 40 in the drain pan 16 differ from the hues of the wall of the drain pan 16. Thus, the objects 40 in the drain pan 16 are detected based on the hues. In an example, contamination including a mold has a hue corresponding to green or blue. The turbidity of water has a hue of red or greenish yellow.

It is preferred for accurate detection of the objects 40 in the drain pan 16 that the predetermined region 31, which is subject to detection of the objects 40, is set in the image 30 (refer to FIG. 4). The image 30 may include a portion of the heat exchanger 13 and a portion of the drain pump 17. The region of the image 30 excluding the heat exchanger 13 and the drain pump 17 is defined as the predetermined region 31 where the objects 40 are detected. The predetermined region 31 is set in advance. The prediction portion 26 detects the objects 40 in the predetermined region 31.

The prediction portion 26 predicts occurrence of the clogging of the drain pump 17 based on at least one of the object amount, the object size, and the object inflow amount. The following description will discuss [a] prediction based on the object amount, [b] prediction based on the object size, and [c] prediction based on the object inflow amount.

(a) Prediction Based on Object Amount

The prediction portion 26 calculates the object amount as follows. In the present embodiment, the object amount is defined as the area of the objects 40 in the predetermined region 31. More specifically, the prediction portion 26 counts the number of pixels, the hue of which has a value in a predetermined range, in the predetermined region 31 to obtain the area of the objects 40. The prediction portion 26 outputs the area of the objects 40 as "the object amount". The object amount may be calculated to be the ratio of the area of the objects 40 to the area of the predetermined region 31.

The prediction portion 26 predicts the clogging of the drain pump 17 based on the object amount. More specifically, the prediction portion 26 predicts at least one of the occurrence rate of the clogging of the drain pump 17 and the occurrence time of the clogging of the drain pump 17 based on the object amount.

The prediction portion 26 includes a first map showing the relationship between the object amount and the occurrence rate of the clogging of the drain pump 17. The first map is formed in advance based on past data, theoretical prediction, or data learning. The prediction portion 26 calculates the occurrence rate of the clogging of the drain pump 17 based on the first map.

The prediction portion 26 includes a second map showing the relationship between the object amount and the time remaining until the drain pump 17 clogs. The second map is formed in advance based on past data, theoretical prediction, or data learning. The prediction portion 26 calculates the time remaining until the drain pump 17 clogs based on the second map, and calculates the occurrence time of the clogging of the drain pump 17 based on the image obtaining time and the remaining time.

Figure 5:
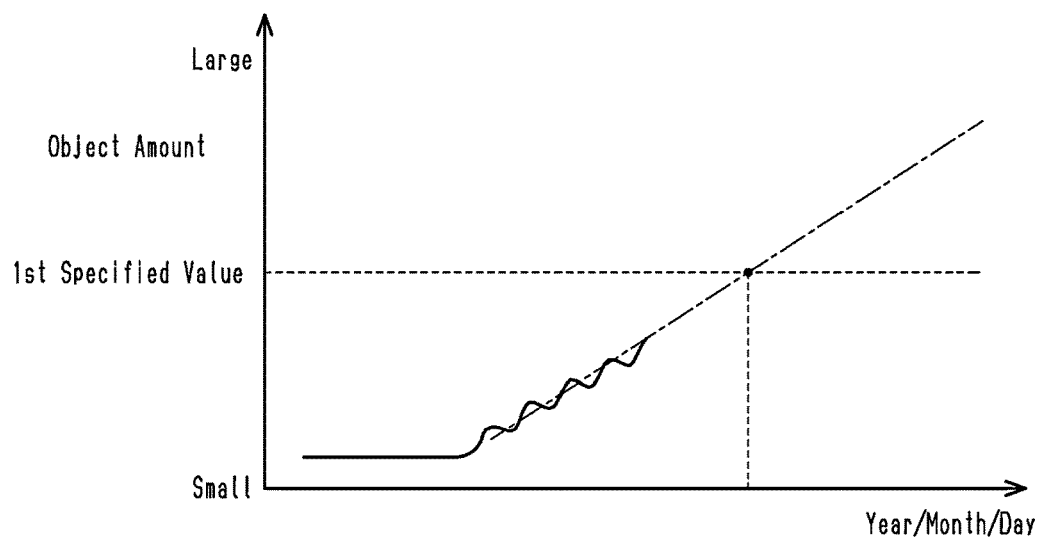
FIG. 5 is a chart showing changes in object amount.

As shown in FIG. 5, the prediction portion 26 may calculate the occurrence time of the clogging of the drain pump 17 based on the change in object amount. In an example, from different object amounts that are obtained at different points in time, the prediction portion 26 obtains an approximate equation for change in the object amount with time. The prediction portion 26 calculates a time at which the object amount exceeds a first specified value based on the approximate equation as "the occurrence time of the clogging of the drain pump 17".

The prediction portion 26 may change the first specified value based on at least one of the operating season of the air conditioner 10 and the installation environment of the air conditioner 10. In an example, when the operating season of the air conditioner 10 is spring, which is the time for starting the cooling operation, the drain pump 17 is more likely to clog. Thus, the first specified value is set to be a value less than when the operation time is summer. In addition, the likelihood of the drain pump 17 clogging varies depending on the installation environment of the air conditioner 10. For example, when the air conditioner 10 is installed in a gym, the drain pump 17 is more likely to clog than when the air conditioner 10 is installed in an office. Thus, when the usage information of the air conditioner 10 is a gym, the first specified value is set to be a value less than when the air conditioner 10 is installed in an office.

(b) Prediction Based on Object Size

The prediction portion 26 calculates the object size as follows. In the present embodiment, the object size is defined as the area of an object 40 that is separately defined in the predetermined region 31.

Figure 6:
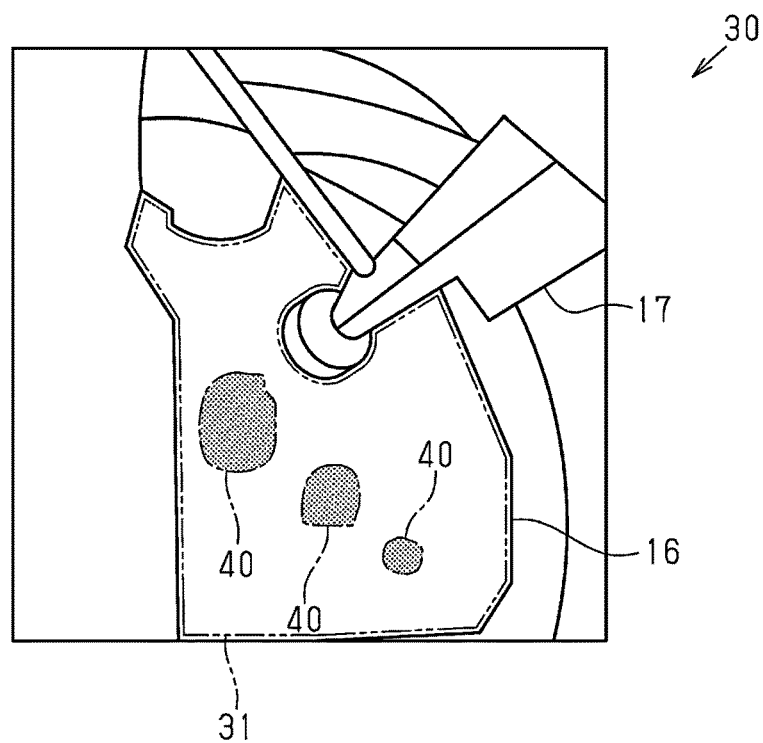
FIG. 6 is a diagram showing another example of an image of the drain pan.

As shown in FIG. 6, in the predetermined region 31, the prediction portion 26 defines a region having a hue in a predetermined range, separates each closed region (region surrounded by single-dashed line in FIG. 6), and counts the number of pixels in the closed region to obtain the size of each object 40. When two or more objects 40 are present in the predetermined region 31, an average value of the sizes of the objects is output as "the object size" at the time of obtaining the image.

Then, the prediction portion 26 predicts the clogging of the drain pump 17 based on the object size. More specifically, the prediction portion 26 predicts at least one of the occurrence rate of the clogging of the drain pump 17 and the occurrence time of the clogging of the drain pump 17 based on the object size.

The prediction portion 26 includes a third map showing the relationship between the object size and the occurrence rate of the clogging of the drain pump 17. The third map is formed in advance based on past data, theoretical prediction, or data learning. The prediction portion 26 calculates the occurrence rate of the clogging of the drain pump 17 based on the third map.

The prediction portion 26 includes a fourth map showing the relationship between the object size and the time remaining until the drain pump 17 clogs. The fourth map is formed in advance based on past data, theoretical prediction, or data learning. The prediction portion 26 calculates the time remaining until the drain pump 17 clogs based on the fourth map and calculates the occurrence time of the clogging of the drain pump 17 based on the image obtaining time and the remaining time.

Figure 7:
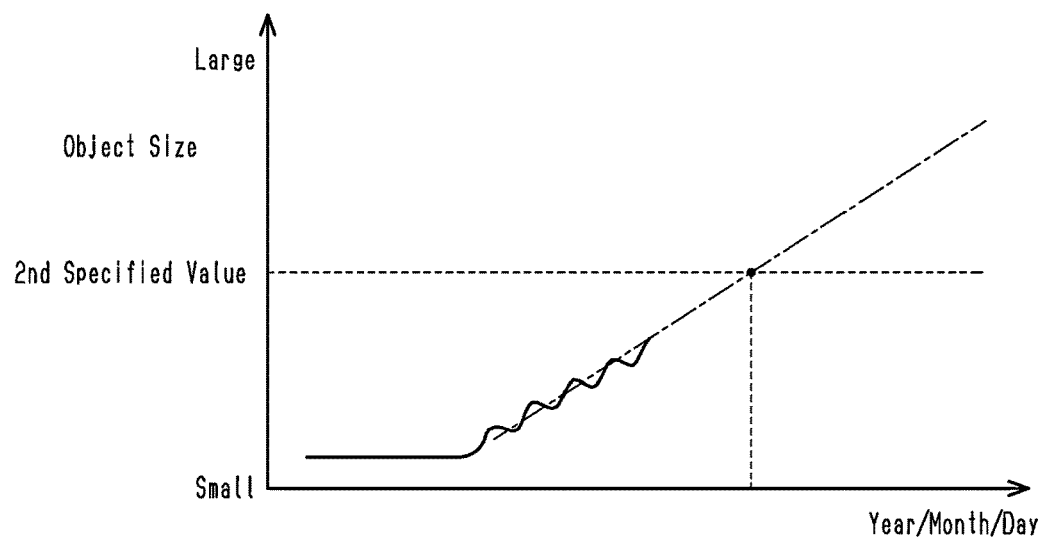
FIG. 7 is a chart showing changes in object size.

As shown in FIG. 7, the prediction portion 26 may calculate the occurrence time of the clogging of the drain pump 17 based on the change in object size. In an example, from different object sizes that are obtained at different points in time, the prediction portion 26 obtains an approximate equation for change in the object size with time. The prediction portion 26 calculates a time at which the object size exceeds a second specified value based on the approximate equation as "the occurrence time of the clogging of the drain pump 17".

The likelihood of occurrence of clogging varies depending on the operating season of the air conditioner 10 and the installation environment of the air conditioner 10. Thus, the prediction portion 26 may change the second specified value based on at least one of the operating season of the air conditioner 10 and the installation environment of the air conditioner 10.

(c) Prediction Based on Inflow Object Amount

The obtaining portion 25 obtains images 30 of the drain pan 16 captured in each predetermined cycle. The prediction portion 26 calculates an object inflow amount over a predetermined period TA based on the captured images 30 and predicts the clogging of the drain pump 17 based on the object inflow amount.

Figure 8:
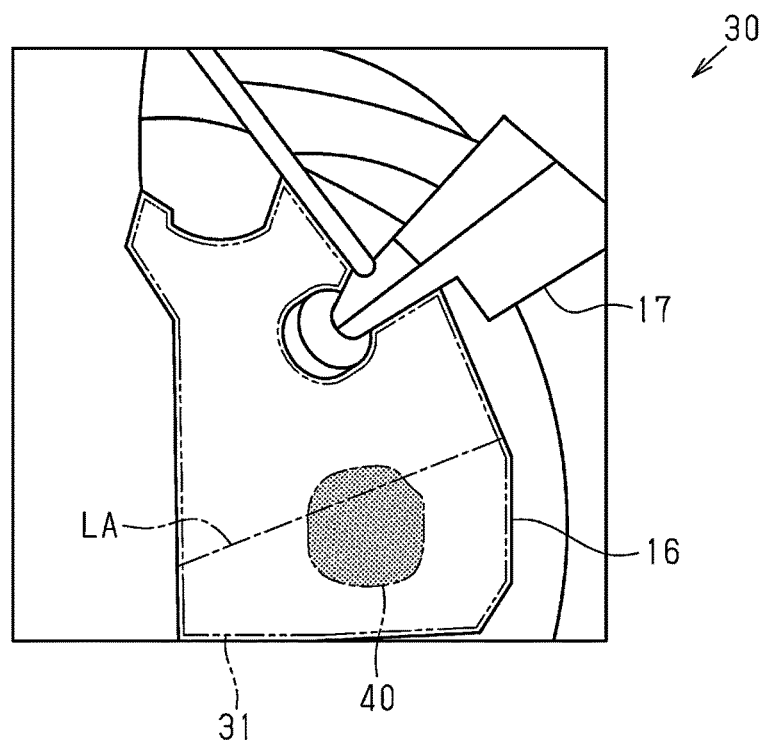
FIG. 8 is a diagram showing an image of the drain pan provided with a reference line.

An example of a method for calculating the object inflow amount will now be described with reference to FIGS. 8 to 10. As shown in FIG. 8, the prediction portion 26 provides each image 30 with a reference line LA at a portion corresponding to a predetermined position of the drain pan 16. The predetermined position is set in advance. In an example, the predetermined position is set in the vicinity of the drain pump 17.

Figure 9:
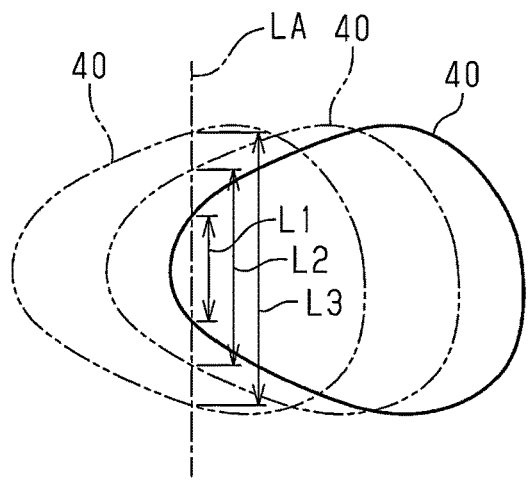
FIG. 9 is a diagram showing an object passing the reference line.

As shown in FIG. 9, the prediction portion 26 detects the length of at least one object 40 along the reference line LA when the object 40 extends over the reference line LA. Since separate determination of each object 40 requires a complex calculation, when two or more objects 40 simultaneously extend over the reference line LA, the prediction portion 26 does not distinguish the objects 40 and calculate the sum of the lengths of the objects 40 along the reference line LA.

Figure 10:
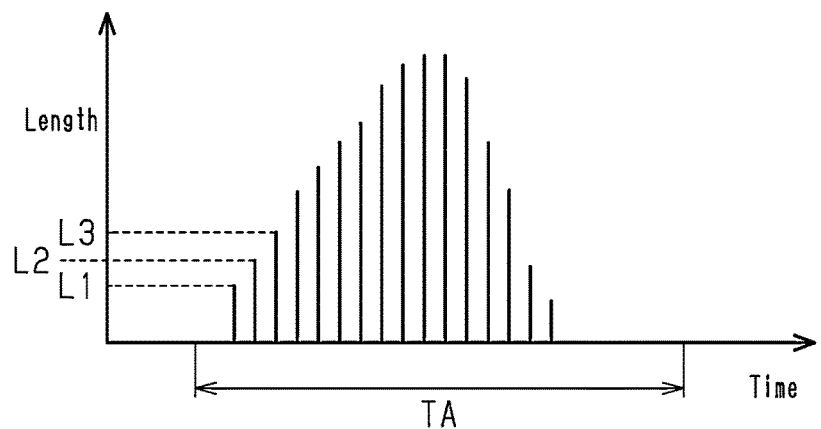
FIG. 10 is a diagram showing changes in the length of the object shown in FIG. 9 along the reference line.

FIG. 10 is a chart plotting the lengths along the reference line LA with respect to time. Length L1 refers to the length of an object 40 along the reference line LA located at a first position and indicated by the solid line in FIG. 9. Length L2 refers to the length of the object 40 along the reference line LA located at a second position that is slightly shifted from the first position. Length L3 refers to the length of the object 40 along the reference line LA located at a third position that is further shifted from the second position. The length along the reference line LA changes in accordance with the shape of the object 40 with time. The prediction portion 26 adds the length of at least one object 40 along the reference line LA in each of consecutive images 30 and outputs the added value as the object inflow amount.

Figure 11:
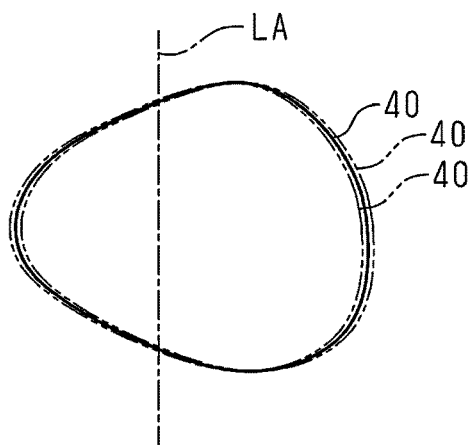
FIG. 11 is a diagram showing an object passing the reference line.

As shown in FIG. 11, the object 40 may adhere to the drain pan 16 and does not move. The adhered object 40 does not easily flow into the drain pump 17 and thus is less likely to cause the drain pump 17 to clog. Thus, it is preferred that such an adhered object 40 is excluded from the calculation of the object inflow amount.

Figure 12:
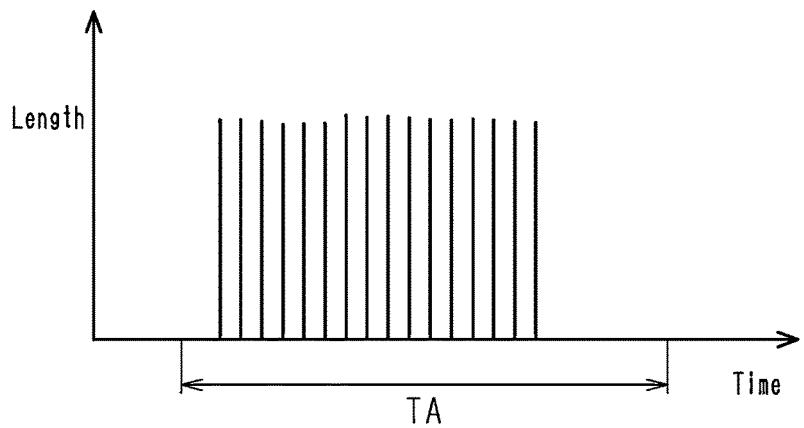
FIG. 12 is a diagram showing changes in the length of the object shown in FIG. 11 along the reference line.

As shown in FIG. 12, when the object 40 does not move, the length along the reference line LA is substantially unchanged with respect to time. When the length along the reference line LA does not change in consecutive images 30, the prediction portion 26 adds the lengths of the object 40 along the reference line LA without adding the consecutive unchanged lengths.

The prediction portion 26 may change the above-described predetermined cycle, which is an image capturing interval, based on the operating load of the air conditioner 10. When the cooling load of the air conditioner increases, the amount of water in the drain pan 16 increases. Accordingly, the amount of water pumped by the drain pump 17 increases, and the speed of water flowing in the drain pan 16 increases. In this case, the object 40 also moves faster so that the object 40 passes the front of the camera in a shorter time as compared to before the increase in the amount of water.

Figure 13:
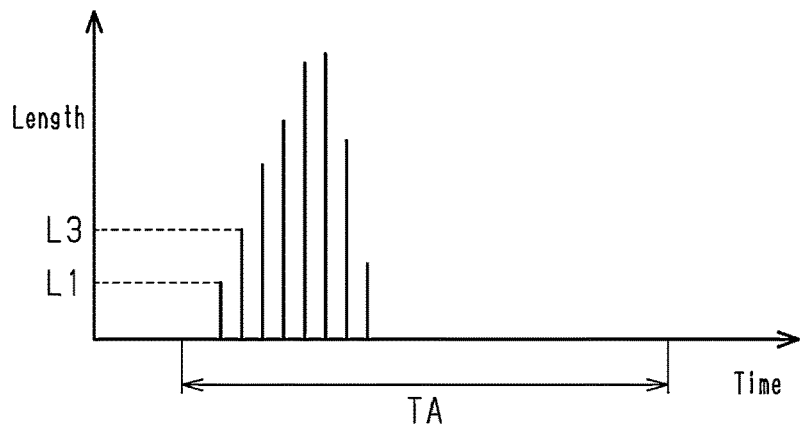
FIG. 13 is a diagram showing changes in the length of the object along the reference line when the moving speed of the object is high.

As shown in FIG. 13, when the water flows fast, images of an object 40 having a given size are captured a fewer number of times than when the water does not flow fast. As a result, when the water flows fast, the prediction portion outputs the object inflow amount as a smaller value than when the water does not flow fast. Thus, the object inflow amount varies depending on the speed of water.

In this regard, when calculating the object inflow amount, the prediction portion 26 obtains information related to the operating load of the air conditioner 10 from the obtaining portion 25 as information related to the speed of water flow. The prediction portion 26 changes the above-described predetermined cycle, which is an image capturing interval, based on the operating load of the air conditioner 10. More specifically, the prediction portion 26 shortens the predetermined cycle as the operating load increases during the cooling operation.

The prediction portion 26 may change the predetermined period TA based on the operating load of the air conditioner 10.

In spring and fall, since the amount of water is less than in summer, the water flows at a lower speed. When the water flows at a lower speed, it takes the object 40 a longer time to pass the front of the camera. When the moving speed of the object 40 is low, the object 40 may not be detected in the predetermined period TA.

Figure 14:
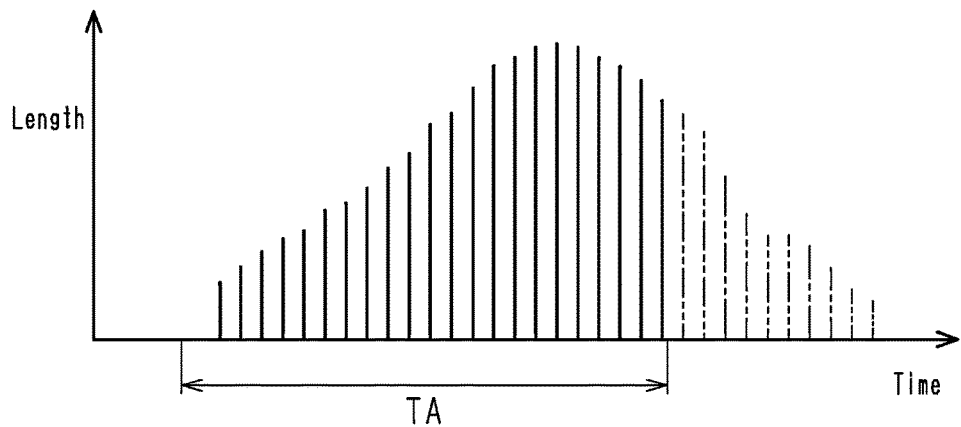
FIG. 14 is a diagram showing changes in the length of the object along the reference line when the moving speed of the object is low.

FIG. 14 is a diagram showing changes in the length of the object 40 along the reference line LA when the speed of water flow is low. FIG. 14 shows a state in which the object 40 has not passed the reference line LA in the predetermined period TA, which is the period for capturing images. In such a case, the amount of the inflow object flowing into the drain pump cannot be accurately measured. Hence, it is preferred that the prediction portion 26 changes the predetermined period TA based on the operating load of the air conditioner It is preferred that the predetermined period TA is fixed to compare object inflow amounts. However, the speed of water flow greatly varies depending on the season. Therefore, it is preferred that the predetermined period TA is changed for each season based on the operating load. More specifically, when an average value of cooling operating loads for a couple of days is less than an operating load threshold value, the prediction portion 26 extends the predetermined period TA.

Then, the prediction portion 26 predicts the clogging of the drain pump 17 based on the object inflow amount. More specifically, the prediction portion 26 predicts at least one of the occurrence rate of the clogging of the drain pump 17 and the occurrence time of the clogging of the drain pump 17 based on the object inflow amount.

The prediction portion 26 includes a fifth map showing the relationship between the object inflow amount and the occurrence rate of the clogging of the drain pump 17. The fifth map is formed in advance based on past data, theoretical prediction, or data learning. The prediction portion 26 calculates the occurrence rate of the clogging of the drain pump 17 based on the fifth map.

The prediction portion 26 includes a sixth map showing the relationship between the object inflow amount and the time remaining until the drain pump 17 clogs. The sixth map is formed in advance based on past data, theoretical prediction, or data learning. The prediction portion 26 calculates the time remaining until the drain pump 17 clogs based on the sixth map and calculates the occurrence time of the clogging of the drain pump 17 based on the image obtaining time and the remaining time.

Figure 15:
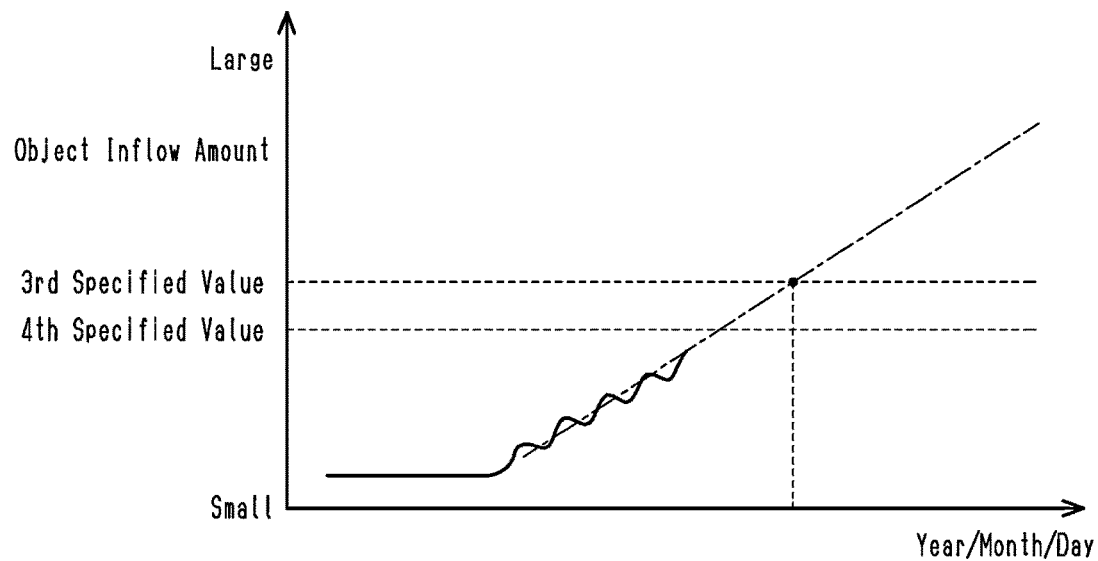
FIG. 15 is a chart showing changes in object inflow amount.

As shown in FIG. 15, the prediction portion 26 may calculate the occurrence time of the clogging of the drain pump 17 based on the change in object inflow amount. In an example, from different object inflow amounts that are obtained at different points in time, the prediction portion 26 obtains an approximate equation for change in the object inflow amount with time. The prediction portion 26 calculates a time at which the object inflow amount exceeds a third specified value based on the approximate equation as "the occurrence time of the clogging of the drain pump 17".

It is preferred that the prediction portion 26 predicts the occurrence time of the clogging of the drain pump 17 when the amount of the inflow object flowing into the drain pan 16 in a predetermined set period exceeds a fourth specified value. The fourth specified value is less than the third specified value. The length of the set period may be equal to the length of the predetermined period TA or may differ from the length of the predetermined period TA.

The likelihood of occurrence of clogging varies depending on the operating season of the air conditioner 10 and the installation environment of the air conditioner 10. Thus, the prediction portion 26 may determine the fourth specified value based on at least one of the operating season of the air conditioner 10 and the installation environment of the air conditioner 10.

In winter, since the amount of water is less than in summer, even when the object inflow amount exceeds the fourth specified value, there is a large margin of time before the object inflow amount reaches the third specified value. In contrast, in summer, since the amount of water is greater than in winter, when the object inflow amount exceeds the fourth specified value, there is a small margin of time before the object inflow amount reaches the third specified value. Hence, it is preferred that the prediction portion 26 determines the fourth specified value based on the operating season of the air conditioner 10. More specifically, the prediction portion 26 sets the fourth specified to be a smaller value for summer than for winter.

In an office, since the object 40 is less likely to be formed than in a gym or the like, even when the object inflow amount exceeds the fourth specified value, there is a large margin of time before the object inflow amount reaches the third specified value. In contrast, in a gym where the humidity is high, the object 40 is more likely to be formed than in an office. Thus, when the object inflow amount exceeds the fourth specified value, there is a small margin of time before the object inflow amount reaches the third specified value. Hence, it is preferred that the prediction portion 26 determines the fourth specified value based on the installation environment of the air conditioner 10. More specifically, the prediction portion 26 sets the fourth specified to be a smaller value for an office than for a gym.

Preferably, the drain pump clog prediction device 1 further includes a notification portion 28 that issues a notification of the result predicted by the prediction portion 26.

Based on terminal information registered in advance in the drain pump clog prediction device 1, the notification portion 28 issues a notification of the result predicted by the prediction portion 26 to a terminal 29 related to the registration.

In an example, the notification portion 28 regularly issues a notification of the result predicted by the prediction portion 26. In the case of the prediction based on the object inflow amount described above in section (c), the notification portion 28 issues a notification of the result predicted by the prediction portion 26 when the object inflow amount exceeds the fourth specified value. The result predicted by the prediction portion 26 includes the occurrence rate of the clogging of the drain pump 17 and the occurrence time of the clogging of the drain pump 17. The prediction portion 26 may send an image of the drain pump 17 to the terminal 29 together with the result. This allows the user of the terminal 29 to schedule cleaning based on the occurrence rate of the clogging of the drain pump 17 and the occurrence time of the clogging of the drain pump 17.

The terminal 29 is a terminal connectable to the network N. Examples of the terminal 29 include a mobile phone, a laptop, a personal computer, a tablet-type personal computer.

Drain Pump Clog Prediction Method

The drain pump clog prediction method will be described below. The drain pump clog prediction method predicts the clogging of the drain pump 17, which is configured to drain water out of the drain pan 16 of the air conditioner 10.

The drain pump clog prediction method includes an obtaining step and a predicting step.

In the obtaining step, the obtaining portion 25 obtains information related to the object 40 in the drain pan 16. The information related to the object 40 in the drain pan 16 is the image 30 of the drain pan 16 being captured.

In the predicting step, the prediction portion 26 calculates at least one of the object amount, the object size, and the object inflow amount based on the information related to the object 40 in the drain pan 16. More specifically, the prediction portion 26 calculates at least one of the object amount, the object size, and the object inflow amount based on the image related to the object 40 in the drain pan 16. The prediction portion 26 further predicts occurrence of the clogging of the drain pump 17 based on at least one of the object amount, the object size, and the object inflow amount.

In a first example, in the predicting step, the prediction portion 26 calculates the object amount of an object 40 that is present in the predetermined region 31 of the drain pan 16 based on the image 30 and predicts the clogging of the drain pump 17 based on the object amount.

In a second example, in the predicting step, the prediction portion 26 calculates the object size of an object 40 that is present in the predetermined region 31 of the drain pan 16 based on the image 30 and predicts the clogging of the drain pump 17 based on the object size.

In a third example, in the obtaining step, the obtaining portion 25 obtains an image of the drain pan 16 captured in each predetermined cycle. In the predicting step, the prediction portion 26 calculates the object inflow amount over the predetermined period TA based on the captured images 30 and predicts the clogging of the drain pump 17 based on the object inflow amount.

In the third example of the predicting step, the prediction portion 26 provides each of the images 30 with the reference line LA at a portion corresponding to the predetermined position of the drain pan 16. The prediction portion 26 detects the length of at least one object 40 along the reference line L when the object 40 extends over the reference line LA. The prediction portion 26 adds the length of at least one object 40 along the reference line LA in each of the consecutive images 30 to calculate the object inflow amount.

In the predicting step, the prediction portion 26 further predicts at least one of the occurrence rate of the clogging of the drain pump 17 and the occurrence time of the clogging of the drain pump 17 as a prediction about occurrence of the clogging of the drain pump 17.

The operation of the present embodiment will now be described.

Water leakage of the indoor unit 11 unexpectedly occurs. A sudden water leakage of the indoor unit 11 is inconvenient for users. Water leakage of the indoor unit 11 may result from the clogging of the drain pump 17. The clogging of the drain pump 17 is caused by an object 40, such as contamination and turbidity in water. The object 40 may gradually accumulate or may suddenly increase. After winter, during which contamination accumulates on the heat exchanger 13, when the cooling operation is executed, the contamination may be dislodged by the condensed water of the heat exchanger 13, so that the water suddenly becomes dirty. In such a case, water leakage frequently occurs.

The drain pump clog prediction device 1 obtains information related to the object 40 in the drain pan 16. The drain pump clog prediction device 1 calculates at least one of the object amount, the object size, and the object inflow amount from the information related to the object 40 in the drain pan 16. The drain pump clog prediction device 1 predicts an occurrence of the clogging of the drain pump 17 based on at least one of the object amount, the object size, and the object inflow amount.

Thus, the drain pump clog prediction device 1 calculates an amount related to the object 40 as the object amount, the object size, and the object inflow amount from the information related to the object 40 of the drain pan 16. The calculation of the amount related to the object 40 increases the accuracy for predicting the clogging of the drain pump 17.

The present embodiment has the following advantages.

(1) The drain pump clog prediction device 1 includes the prediction portion 26. The prediction portion 26 calculates at least one of the object amount, the object size, and the object inflow amount based on information obtained by the obtaining portion 25 and predicts occurrence of the clogging of the drain pump 17 based on at least one of the object amount, the object size, and the object inflow amount. This configuration predicts the clogging of the drain pump 17.

(2) The obtaining portion 25 obtains an image 30 formed based on the image-capturing of the drain pan 16. The prediction portion 26 calculates at least one of the object amount, the object size, and the object inflow amount based on the image 30 and predicts the clogging of the drain pump 17 based on at least one of the object amount, the object size, and the object inflow amount. This configuration predicts the clogging of the drain pump 17 based on the image 30 of the drain pan 16.

(3) The prediction portion 26 calculates the object amount of the object 40 present in the predetermined region 31 of the drain pan 16 based on the image 30. The prediction portion 26 predicts the clogging of the drain pump 17 based on the object amount. This configuration predicts the clogging of the drain pump 17 based on the object amount obtained from the image 30 of the drain pan 16.

(4) The prediction portion 26 calculates the object size of the object 40 present in the predetermined region 31 of the drain pan 16 based on the image 30. The prediction portion 26 predicts the clogging of the drain pump 17 based on the object size. This configuration predicts the clogging of the drain pump 17 based on the object size obtained from the image 30 of the drain pan 16.

(5) The obtaining portion 25 obtains images 30 of the drain pan 16 captured in each predetermined cycle over at least the predetermined period TA. The prediction portion 26 calculates the object inflow amount over the predetermined period TA based on the captured images 30. The prediction portion 26 predicts the clogging of the drain pump 17 based on the object inflow amount. This configuration predicts the clogging of the drain pump 17 based on the object inflow amount obtained from the image 30 of the drain pan 16.

(6) In the calculation of the object inflow amount described in (5), the prediction portion 26 provides each image 30 with a reference line LA at a portion corresponding to a predetermined position of the drain pan 16. The prediction portion 26 detects the length of at least one object 40 along the reference line LA when the object 40 extends over the reference line LA and adds the length of at least one object 40 along the reference line LA in each of the consecutive images 30. The prediction portion 26 outputs the added value of the lengths as the object inflow amount. This configuration simplifies the calculation of the object inflow amount.

(7) When the object 40 does not move, the length of the object 40 along the reference line LA is constant in the images 30 obtained in each predetermined cycle. Therefore, no change in the length of the object 40 along the reference line LA indicates that the object 40, which extends over the reference line LA, is not moving. It is preferred that such an object 40 is excluded from the object inflow amount.

Hence, in the addition of lengths described in (6), when the length along the reference line LA does not change in consecutive images 30, the prediction portion 26 adds the lengths of the object 40 along the reference line LA without adding the consecutive unchanged lengths. This configuration accurately calculates the object inflow amount.

(8) Preferably, in the image capturing described in (5), the prediction portion 26 changes the predetermined cycle based on the operating load of the air conditioner 10.

A change in the operating load of the air conditioner 10 changes the speed of water flowing into the drain pan 16. When images of the drain pan 16 are captured a fixed number of times in the predetermined period TA, the number of times the object 40 extends over the reference line LA changes as the flow speed changes. As a result, even when the same size of the object 40 flows in, the object inflow amount calculated by the prediction portion 26 may vary as the flow speed changes. The above configuration changes the predetermined cycle, which is an interval between obtainments of the images 30 used for calculation of the object inflow amount, based on the operating load of the air conditioner 10. Thus, the object inflow amount is accurately calculated.

(9) Preferably, in the image capturing described in (5), the prediction portion 26 changes the predetermined period TA based on the operating load of the air conditioner 10.

This configuration changes the predetermined period TA, for which the object inflow amount is calculated, in accordance with the operating load of the air conditioner 10. Thus, the accuracy for predicting the clogging of the drain pan 16 is increased.

(10) The prediction portion 26 predicts at least one of the occurrence rate of the clogging of the drain pump 17 and the occurrence time of the clogging of the drain pump 17 as a prediction about occurrence of the clogging of the drain pump 17. This configuration provides the user with at least one of the occurrence rate of the clogging of the drain pump 17 and the occurrence time of the clogging of the drain pump 17.

(11) The prediction portion 26 predicts the occurrence time of the clogging of the drain pump 17 when the amount of the inflow object flowing into the drain pan 16 in a predetermined set period exceeds a fourth specified value. This configuration predicts the occurrence time of the clogging of the drain pump 17 only when the amount of object flowing into the drain pan 16 in the predetermined set period exceeds the fourth specified value. Thus, the calculation load on the drain pump clog prediction device 1 is reduced.

(12) The prediction portion 26 determines the fourth specified value based on at least one of the operating season of the air conditioner 10 and the installation environment of the air conditioner 10. This configuration determines the fourth specified value, which restricts prediction of the clogging of the drain pump 17, based on at least one of the operating season and the installation environment. Accordingly, the frequency of making a prediction is changed based on at least one of the operating season and the installation environment. In an example, the prediction may be made more frequently during time when the drain pump 17 is likely to clog.

(13) The drain pump clog prediction device 1 further includes a notification portion that issues a notification of the result predicted by the prediction portion 26. This configuration notifies the result predicted by the prediction portion 26 to the user. In an example, the notification portion may output the result predicted by the prediction portion 26 to the terminal 29 that is used by the user.

(14) The air conditioner 10 includes the drain pump clog prediction device 1 having one of the configurations described above. In an example, the indoor unit 11 is provided with the drain pump clog prediction device 1. The outdoor unit may be provided with the drain pump clog prediction device 1 used for the drain pump 17 of the indoor unit 11. This configuration allows the air conditioner 10 to predict the clogging of the drain pump 17. For example,

(15) The drain pump clog prediction method includes the obtaining step for obtaining information related to the object 40 in the drain pan 16 and the predicting step. In the predicting step, the prediction portion 26 calculates at least one of the object amount, the object size, and the object inflow amount based on information and predicts occurrence of the clogging of the drain pump 17 based on at least one of the object amount, the object size, and the object inflow amount. This configuration predicts the clogging of the drain pump 17.

(16) In the obtaining step, the obtaining portion 25 obtains an image 30 formed based on the image-capturing of the drain pan 16. In the predicting step, the prediction portion 26 calculates at least one of the object amount, the object size, and the object inflow amount based on the image 30 and predicts the clogging of the drain pump 17 based on at least one of the object amount, the object size, and the object inflow amount. This configuration predicts the clogging of the drain pump 17 based on the image 30 of the drain pan 16.

(17) In the predicting step, the prediction portion 26 calculates the object amount of an object 40 that is present in the predetermined region 31 of the drain pan 16 based on the image 30 and predicts the clogging of the drain pump 17 based on the object amount. This configuration predicts the clogging of the drain pump 17 based on the object amount obtained from the image 30 of the drain pan 16.

(18) In the predicting step, the prediction portion 26 calculates the object size of an object 40 that is present in the predetermined region 31 of the drain pan 16 based on the image 30 and predicts the clogging of the drain pump 17 based on the object size. This configuration predicts the clogging of the drain pump 17 based on the object size obtained from the image 30 of the drain pan 16.

(19) In the obtaining step, the obtaining portion 25 obtains images 30 of the drain pan 16 captured in each predetermined cycle. In the predicting step, the obtaining portion 25 calculates the object inflow amount over the predetermined period based on the captured images 30 and predicts the clogging of the drain pump 17 based on the object inflow amount. This configuration predicts the clogging of the drain pump 17 based on the object inflow amount obtained from the image 30 of the drain pan 16.

(20) In the predicting step, the prediction portion 26 provides each image 30 with a reference line LA at a portion corresponding to a predetermined position of the drain pan 16. The prediction portion 26 detects the length of at least one object 40 along the reference line LA when the object 40 extends over the reference line LA and adds the length of at least one object 40 along the reference line LA in each of the consecutive images 30. The prediction portion 26 outputs the added value of the lengths as the object inflow amount. This configuration simplifies the calculation of the object inflow amount.

(21) In the predicting step, the prediction portion 26 predicts at least one of the occurrence rate of the clogging of the drain pump 17 and the occurrence time of the clogging of the drain pump 17 as a prediction about an occurrence of the clogging of the drain pump 17. This configuration provides the user with at least one of the occurrence rate of the clogging of the drain pump 17 and the occurrence time of the clogging of the drain pump 17.

Modified Examples

In addition to the embodiment described above, the drain pump clog prediction device 1 according to the present disclosure is applicable to, for example, modified examples that are described below and combinations of at least two of the modified examples that do not contradict each other. In addition to the embodiment described above, the drain pump clog prediction method according to the present disclosure is applicable to, for example, modified examples that are described below and combinations of at least two of the modified examples that do not contradict each other.

The obtaining portion 25 may obtain scan data obtained by scanning the drain pan 16 instead of the image 30. The scan data of the drain pan 16 is obtained with a rotatable or movable line sensor. The drain pan 16 is scanned by a scanner. The scanner is disposed in the indoor unit 11. Preferably, the scanner outputs a laser beam that is easily absorbed by the object 40 and is easily reflected by the drain pan 16. The scanner calculates the object amount, the object size, and the object inflow amount based on the quantity of reflected light.

The obtaining portion 25 of the drain pump clog prediction device 1 may be included in an edge computer of the air conditioner 10. The edge computer obtains various types of information from the air conditioner 10, transmits the information obtained from the air conditioner 10 to other computers connected to the network, and transmits information from the computers to the air conditioner 10.

Figure 16:
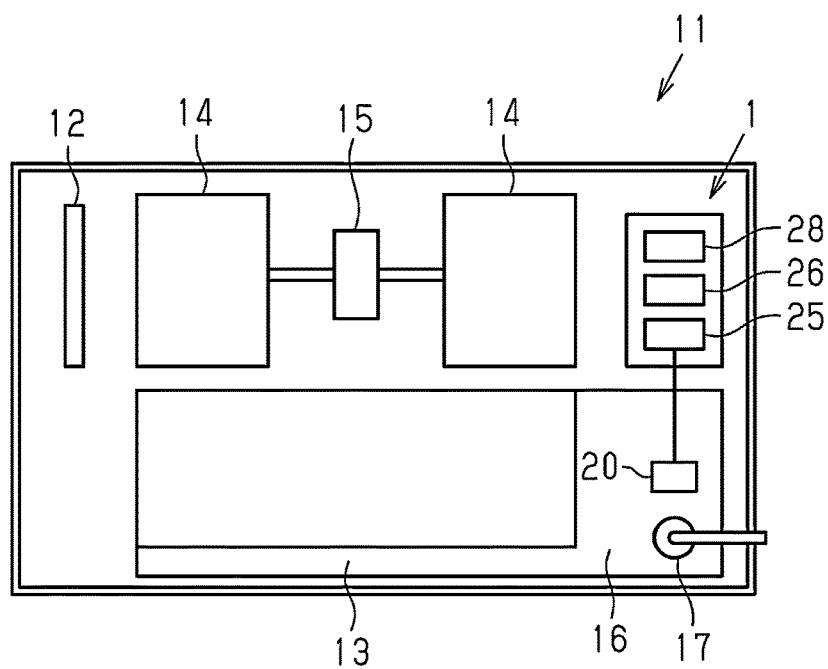
FIG. 16 is a plan view showing the internal structure of an indoor unit including a drain pump clog prediction device.

As shown in FIG. 16, the air conditioner 10 may include the drain pump clog prediction device 1 according to the present embodiment and the modified examples. The indoor unit 11 of the air conditioner 10 may incorporate the drain pump clog prediction device 1. The obtaining portion 25 of the drain pump clog prediction device 1 may be disposed on the same substrate as the air-conditioning controller 12. In the air conditioner 10, the drain pump clog prediction device 1 may be disposed outside the case 18 of the indoor unit 11.

While the embodiment of the device has been described herein above, it is to be appreciated that various changes in form and detail may be made without departing from the spirit and scope of the device presently or hereafter claimed.

The invention claimed is:

1. A drain pump clog prediction device that predicts clogging of a drain pump configured to drain water out of a drain pan of an air conditioner, the drain pump clog prediction device, comprising:
   an obtaining portion that obtains information related to an object in the drain pan; and
   a prediction portion that calculates at least one of an object amount, an object size, and an object inflow amount based on information obtained by the obtaining portion and predicts occurrence of clogging of the drain pump based on at least one of the object amount, the object size, and the object inflow amount.

2. The drain pump clog prediction device according to claim 1, wherein
   the obtaining portion obtains an image formed based on image-capturing of the drain pan as the information, and
   the prediction portion calculates at least one of the object amount, the object size, and the object inflow amount based on the image and predicts clogging of the drain pump based on at least one of the object amount, the object size, and the object inflow amount.

3. The drain pump clog prediction device according to claim 2, wherein the prediction portion calculates the object amount of the object present in a predetermined region of the drain pan based on the image and predicts clogging of the drain pump based on the object amount.

4. The drain pump clog prediction device according to claim 2, wherein the prediction portion calculates the object size of the object present in a predetermined region of the drain pan based on the image and predicts clogging of the drain pump based on the object size.

5. The drain pump clog prediction device according to claim 2, wherein
   the obtaining portion obtains an image of the drain pan captured in a predetermined cycle, and
   the prediction portion calculates the object inflow amount over a predetermined period based on captured images and predicts clogging of the drain pump based on the object inflow amount.

6. The drain pump clog prediction device according to claim 5, wherein the prediction portion provides each of the images with a reference line at a portion corresponding to a predetermined position of the drain pan, detects a length of at least one object along the reference line when the object extends over the reference line, and adds the length of at least one object along the reference line in each of consecutive ones of the images to calculate the object inflow amount.

7. The drain pump clog prediction device according to claim 6, wherein when the length along the reference line does not change in consecutive ones of the images, the prediction portion adds the length of the object along the reference line without adding the consecutive unchanged lengths.

8. The drain pump clog prediction device according to claim 5, wherein the prediction portion changes the predetermined cycle based on an operating load of the air conditioner.

9. The drain pump clog prediction device according to claim 5, wherein the prediction portion changes the predetermined period based on an operating load of the air conditioner.

10. The drain pump clog prediction device according to claim 1, wherein the prediction portion predicts at least one of an occurrence rate of clogging of the drain pump and an occurrence time of clogging of the drain pump as a prediction about occurrence of clogging of the drain pump.

11. The drain pump clog prediction device according to claim 10, wherein
the prediction portion is configured to predict an occurrence time of clogging of the drain pump, and
the prediction portion predicts the occurrence time of clogging of the drain pump when the object inflow amount flowing into the drain pan exceeds a specified value in a predetermined set period.

12. The drain pump clog prediction device according to claim 11, wherein the prediction portion determines the specified value based on at least one of an operating season of the air conditioner and an installation environment of the air conditioner.

13. The drain pump clog prediction device according to claim 1, further comprising a notification portion that issues a notification of a result predicted by the prediction portion.

14. An air conditioner, comprising the drain pump clog prediction device according to claim 1.

15. A drain pump clog prediction method that predicts clogging of a drain pump, which is configured to drain water out of a drain pan of an air conditioner, the drain pump clog prediction method, comprising:
obtaining information related to an object in the drain pan; and
calculating at least one of an object amount, an object size, and an object inflow amount based on the information and predicting occurrence of clogging of the drain pump based on at least one of the object amount, the object size, and the object inflow amount.

16. The drain pump clog prediction method according to claim wherein
the obtaining information includes obtaining an image formed based on image-capturing of the drain pan as the information, and
the predicting occurrence of clogging includes calculating at least one of the object amount, the object size, and the object inflow amount based on the image and predicting clogging of the drain pump based on at least one of the object amount, the object size, and the object inflow amount.

17. The drain pump clog prediction method according to claim 16, wherein the predicting occurrence of clogging includes calculating the object amount of the object present in a predetermined region of the drain pan based on the image and predicting clogging of the drain pump based on the object amount.

18. The drain pump clog prediction method according to claim 16, wherein the predicting occurrence of clogging includes calculating the object size of the object present in a predetermined region of the drain pan based on the image and predicting clogging of the drain pump based on the object size.

19. The drain pump clog prediction method according to claim 16, wherein
the obtaining information includes obtaining an image of the drain pan captured in a predetermined cycle, and
the predicting occurrence of clogging includes calculating the object inflow amount over a predetermined period based on captured images and predicting clogging of the drain pump based on the object inflow amount.

20. The drain pump clog prediction method according to claim 19, wherein the predicting occurrence of clogging includes providing each of the images with a reference line at a portion corresponding to a predetermined position of the drain pan, detecting a length of at least one object along the reference line when the object extends over the reference line, and adding the length of at least one object along the reference line in each of consecutive ones of the images to calculate the object inflow amount.

21. The drain pump clog prediction method according to claim 15, wherein the predicting occurrence of clogging includes predicting at least one of an occurrence rate of clogging of the drain pump and an occurrence time of clogging of the drain pump as a prediction about occurrence of clogging of the drain pump.

* * * * *